United States Patent
Spratt et al.

[11] 3,895,224
[45] July 15, 1975

[54] MULTI-VARIATE NON-LINEAR TRANSFER FUNCTION GENERATOR

[75] Inventors: Brendan J. Spratt, Boca Raton; James C. Lumsden, Plantation, both of Fla.

[73] Assignee: The Bendix Corporation, Southfield, Mich.

[22] Filed: Mar. 25, 1974

[21] Appl. No.: 454,359

[52] U.S. Cl. .......................... 235/197; 235/150.26
[51] Int. Cl.[2] .......................................... G06G 7/28
[58] Field of Search . 235/197, 186, 150.26, 150.27; 307/229

[56] References Cited
UNITED STATES PATENTS

| | | | |
|---|---|---|---|
| 3,171,023 | 2/1965 | De Seguin Des Hons | 235/197 |
| 3,560,726 | 2/1971 | Platt | 235/197 |
| 3,560,727 | 2/1971 | Schussler | 235/197 |
| 3,622,770 | 11/1971 | Edelson | 235/197 |
| 3,644,836 | 2/1972 | Johnson | 235/197 X |
| 3,686,478 | 8/1972 | Goldberg et al. | 235/197 X |

*Primary Examiner*—Joseph F. Ruggiero
*Attorney, Agent, or Firm*—W. G. Christoforo; Bruce L. Lamb

[57] ABSTRACT

A non-linear transfer function generator uses a plurality of operational amplifiers to generate a family of curves of the same generic origin by piece-wise straight line approximation. One input terminal of each operational amplifier is connected to receive a signal related to one variable function. The other input terminal of each operational amplifier is connected through a signal divider to a source of a signal related to a second variable function. In addition, the output of each operational amplifier is clamped to the second variable function. The outputs of the various operational amplifiers are summed to produce a multi-variate non-linear transfer function dependent upon the two input variable functions.

13 Claims, 3 Drawing Figures

3,895,224

MULTI-VARIATE NON-LINEAR TRANSFER FUNCTION GENERATOR

BACKGROUND OF THE INVENTION

This invention relates to non-linear trasnfer function generators which can generate a generic family of curves in accordance with two independent variables. The invention is more particularly related to slant range correctors of the type which find use in aircraft instruments, for example, in area navigation instruments.

Most aircraft have on-board distance measuring equipment which cooperate with a ground station, normally at a known geographic location, to produce a signal which is related to the straight line range between the aircraft and the ground station. This range is termed the slant range since it lies in a straight line which slants downward from the aircraft to the ground station and comprises the hypotenuse of a right triangle, one leg of which is the aircraft altitude and the other leg of which is the horizontal range from the aircraft to the ground station. A signal related to horizontal range is required as input to many aircraft instruments and the horizontal range can be determined by solving the right triangle since the slant range and the aircraft altitude are known.

Curves dependent upon altitude and slant range can be calculated to provide a measure of the difference between slant range and horizontal range. This difference is herein termed range error and is subtracted from slant range to produce horizontal range. The curves can be a generic family of constant altitude curves plotted against slant range and range error as orthogonal coordinates. If these curves can be conveniently generated from known inputs of altitude and slant range, it will be a simple task to subtract the range error from the slant range to provide a signal related to horizontal range. In other words, convenient generation of the range error curves will provide a simple means for solving the range/altitude right triangle.

SUMMARY OF THE INVENTION

Circuits are known which utilize the well known techniques of transfer function approximation by means of piece-wise linear segmentation. These circuits permit a non-linear function to be generated by generating a series of straight line segments which approximate the desired curve. The present invention is an improvement of the aforementioned means of piece-wise linear segmentation that permits a whole family of curves of the same generic origin to be produced or generated.

This is accomplished by providing a plurality of operational amplifiers, one input of each is connected to receive a signal related to slant range. The other inputs are connected respectively to signals related, through a signal divider, to aircraft altitude. The signals related to aircraft altitude determine the break points of the curves to be generated while the amplification of the various operational amplifiers determines the slope of the various straight line segments which approximate the curves to be generated. As the altitude signal changes, the specific curve to be generated changes with the common break points of the family of curves moving generally along lines radial from the family origin. The output of the operational amplifiers, whose sum comprises the range error, is subtracted from the slant range to produce the signal related to actual horizontal range.

It is thus an object of this invention to provide a multivariate non-linear transfer function generator.

It is another object of this invention to provide means for solving the aircraft range/altitude triangle so as to generate a signal related to the horizontal range of an aircraft in flight from a known ground position.

It is a further object of this invention to provide means for generating a signal related to the horizontal range of an aircraft from a known ground position having inputs of aircraft altitude and slant range to the known ground position.

These and other objects of the invention will become apparent from a reading and understanding of the following description of the preferred embodiment and the drawings.

DESCRIPTION OF THE PREFERRED EMBODIMENT

Figure 1:
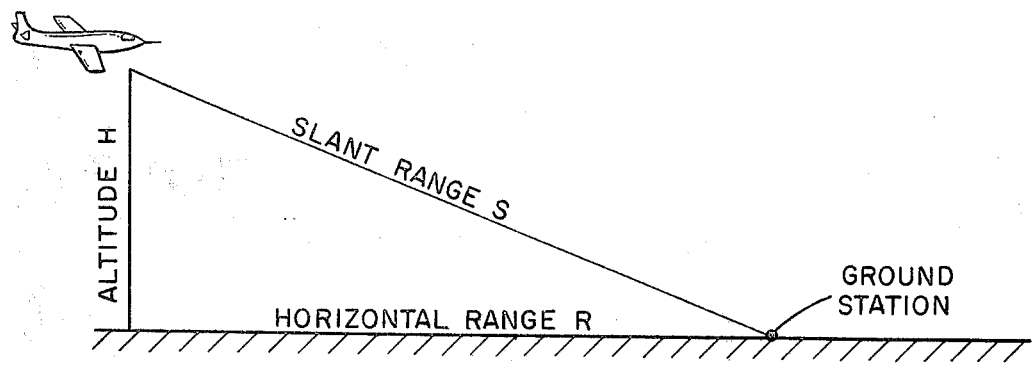
FIG. 1 illustrates the aircraft range/altitude triangle as an aircraft approaches a ground station

Refer to FIG. 1 where an aircraft is seen approaching a ground station. It is assumed that the aircraft has on-board equipment, such as distance measuring equipment, which cooperates with the ground station to generate a signal which is related to the straight line or slant range between the aircraft and the ground station. It is also assumed that the aircraft has an on-board altimeter which produces a signal related to the altitude of the aircraft. The slant range comprises the hypotenuse of a right triangle of which altitude and horizontal range comprise the two legs. A signal related to horizontal range is required by various of the aircraft instruments and hence it is desirable to solve the aircraft range altitude triangle to produce the horizontal range signal. It should be obvious, that for a particular instantaneous horizontal position of an aircraft the slant range will vary as altitude varies. In other words, the horizontal range of the aircraft and the ground station is dependent upon two independent variables, aircraft altitude and aircraft slant range to the ground station.

The solution of the aircraft altitude slant range triangle is as follows:

$$R = \sqrt{S^2 - H^2} = S - e \quad (1)$$

$$e = S - \sqrt{S^2 - H^2}$$

where
R = horizontal range
S = slant range
H = altitude
e = slant range error.

Figure 2:
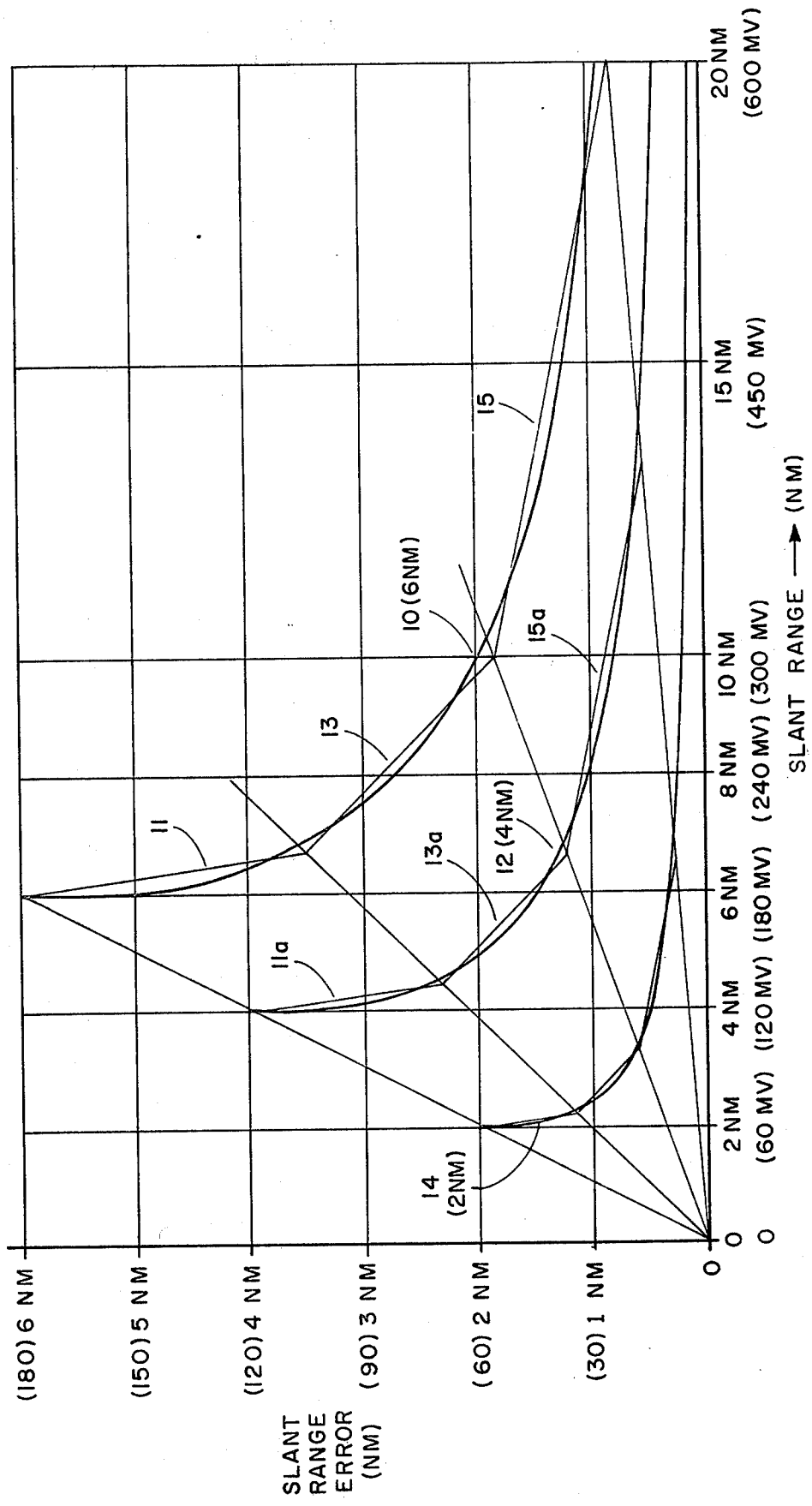
FIG. 2 shows a representative number of constant altitude range error curves of the type which can be generated by the multivariate non-linear transfer function generator to be described.

Refer now to FIG. 2 where there are seen three curves which are representative of the generic family of curves plotting equation (1) above, each curve representing a predetermined fixed altitude and with the X axis being calibrated in nautical miles of slant range and the Y axis being calibrated in nautical miles of slant range error. In particular, curve 10 is a curve corresponding to an altitude of six nautical miles, curve 12 corresponds to four nautical miles altitude and curve 14 corresponds to two nautical miles altitude. As an example of the utility of the curves, consider that an aircraft is at an altitude of six nautical miles and has a slant range of 8 miles from the ground station. Reading up from eight nautical miles on the X axis vertically to curve 10 and then horizontally over to the Y axis shows that the slant range error under these conditions is 2.7 nautical miles. The horizontal range, which is slant range minus the slant range error, is thus 5.3 nautical miles.

Figure 3:
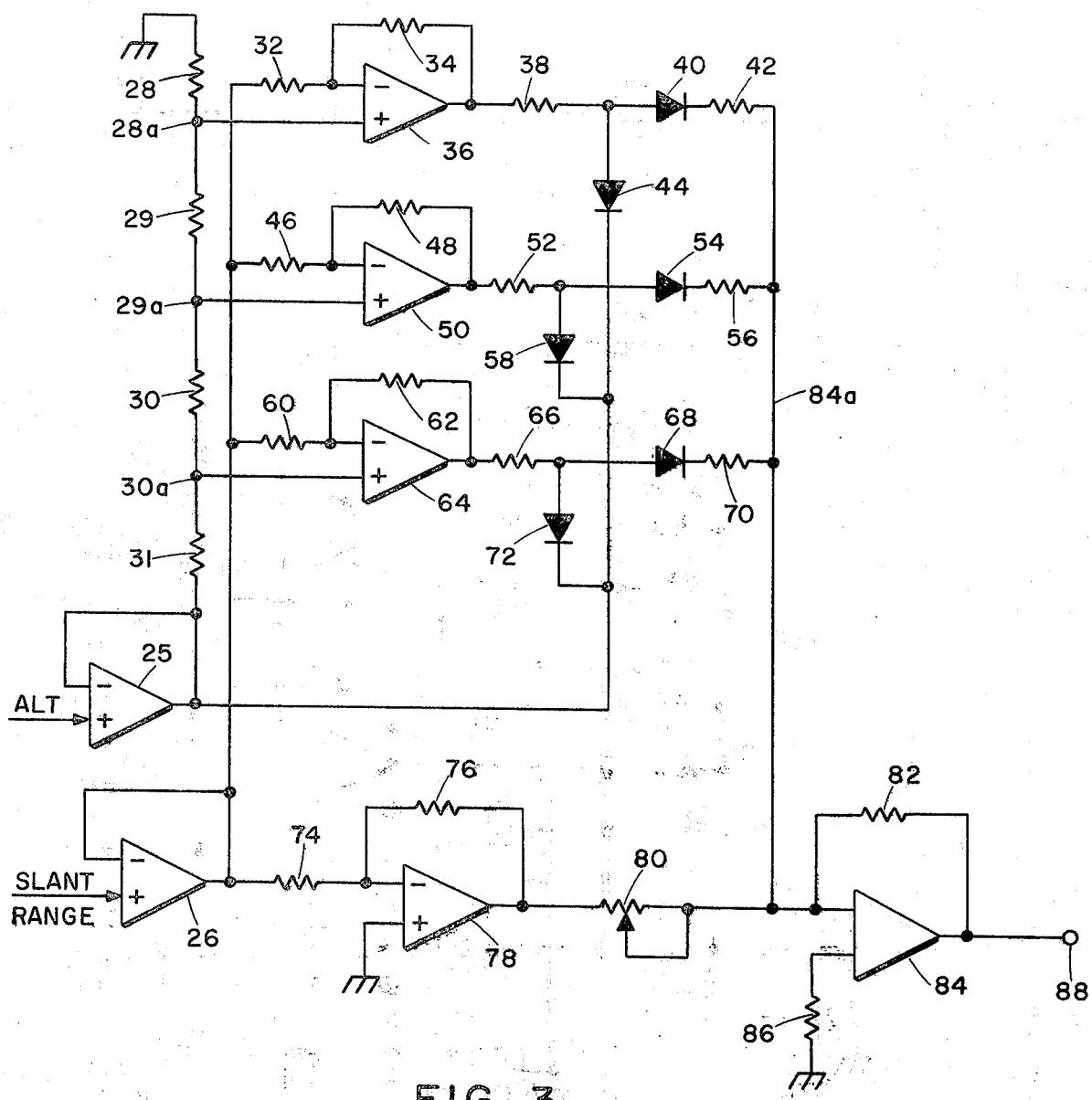
FIG. 3 is a modified schematic showing a slant range corrector for use with aircraft instruments and having inputs of slant range and aircraft altitude and including a multivariate non-linear transfer function generator.

Refer now to FIG. 3 where there is shown the schematic of means for generating functions similar to those seen at FIG. 2 and is capable of generating a close approximation of the specific function shown upon proper selection of the proper resistive elements. In addition, FIG. 3 shows further circuitry for producing a signal related to horizontal range with inputs of slant range and altitude. The circuit actually generates an approximate curve based on piece-wise linear segmentation of the various curves, corresponding to linear segments 11, 13 and 15 of curve 10 of FIG. 2. These three linear segments are produced by the cumulative effect of the operational elements which include operational elements 36, 50 and 64, respectively. Of course, more perfect approximation of the curve can be attained by providing further operational elements so as to permit further segmentation of the curves. It will become obvious to one skilled in the art how these further operational elements can be provided as the description of this embodiment proceeds. In the schematic, a signal having a voltage level proportional to slant range is applied to buffer amplifier 26 and a signal having a voltage level proportional to aircraft altitude is applied to buffer amplifier 25. The altitude signal is thus applied across the voltage divider comprised of resistors 28 to 31 with interior point 28a thereof being connected to the non-inverting input terminal of operational amplifier 36, point 29a being connected to the non-inverting input terminal of operational amplifier 50, etc. The slant range signal is applied to the inverting input terminals of operational amplifiers 36, 50 and 64, respectively, through resistors 32, 46 and 60. The output terminal and the inverting input terminals of operational amplifiers 36, 50 and 64 are shunted respectively by resistors s148 and 62. The output terminal of amplification amplifier 36 is connected serially through resistor 38, diode 40 and resistor 42 to a summing terminal 84a. The output terminal of operational amplifier 50 is connected to summing point 84a through the serial arrangement of resistor 52, diode 54 and resistor 56 while the output terminal of operational amplifier 64 is similarly connected to the summing terminal through resistor 66, diode 68 and resistor 70. The junctions of resistors 38, 52 and 66, respectively, with diodes 40, 54 and 68 are connected through diodes 44, 58 and 72, respectively, to the output terminal of buffer amplifier 25.

The slant range signal is also applied to the inverter comprised of operational amplifier 78 having series resistor 74 and shunt resistor 76, with the resistance of these resistors being equal to one another, and through adjustable resistor 80 to the summing point 84a. There thus appears at summing point 84a a signal related to the cumulative effect of the operational elements comprised of operational amplifiers 36, 50 and 64, which as been mentioned before is related to slant range error, and also a signal related to the inverse of slant range. The summing amplifier comprised of operational amplifier 84 together with shunt resistor 82 and resistor 86 connected between one of its inputs and a constant voltage terminal such as ground, provides at its output terminal 88 a signal which is related to the difference between slant range and the slant range error, that is a signal related to horizontal range.

In the following explanation of the operation of the circuit of FIG. 3, the voltage drop across the various diodes has been ignored in order to simplify and make the explanation clearer. One skilled in the art will be able to easily take into account the diode drops, if desired, in practicing the invention in accordance with this description. Before explaining the operation of the circuit of FIG. 3, it should first be realized that the curve involving the greatest error correction should be selected to determine the number of segments needed to achieve the desired degree of accuracy. In this embodiment, it is assumed that the maximum altitude of interest is six nautical miles, hence curve 10 is selected. Each segment is assigned an operational element. The gain of each element is adjusted to produce an output voltage which is equal to the clamped voltage, that is, the voltage clamped by the diodes shown in the schematic, when the input voltage differential of the various operational amplifiers is equal to the voltage corresponding to the slant range error signal at the end points of the linear approximations of FIG. 2. Next, the weighting of each segment is determined from the linearized approximation curve and implemented by the selection of an approximate value for the corresponding resistor 42, 56 or 70. Finally, the overall correction factor weighting is determined and a suitable fixed feedback resistor selected for the summing amplifier 84. It is also, of course, necessary to determine the constant of proportionality for the slant range and altitude signals. In this example, and in the curves of FIG. 2 where $V_R$ is the constant of proportionality for the slant range signal and for the computed horizontal range signal and $V_H$ is the constant of proportionality for the altitude signal:

Let $V_R = 30$ mV/N.M. (nautical mile)
and $V_H = 30$ mV/N.M.

For FIG. 2 it can be seen that the break points of the line segments are at twenty nautical miles (600 millivolts); ten nautical miles (300 millivolts); and 6.7 nautical miles (200 millivolts). Note that in this example no range error correction is made beyond 20 nautical miles, however, it should be obvious that such range correction can be made. In this example, the maximum altitude of interest is 6 nautical miles or 36,000 feet. The end point of the curve is thus at 6 nautical miles (180 millivolts) altitude and corresponds to a point directly over the ground station where altitude is equal to slant range. The voltage corresponding to the maximum altitude of interest is herein termed $V_{c1}$ max. and, of course, is equal in this example to the product of $V_H$ and the altitude of interest in thousands of feet, or 10.8 volts.

The general equation for the amplification from a typical stage in the circuit of FIG. 3 is:

$$A = \frac{V_{cl} - V_1}{V_1 - V_2}$$

where
 $V_1$ = slant range signal at one end of segment
 $V_2$ = slant range signal at other end of segment.

Thus, in the specific embodiment shown and referring to the value shown in FIG. 2, the amplification of the various stages is:

$$A_1 = \frac{(10800-600)}{(600-300)} = 34$$

$$A_2 = \frac{(10800-300)}{(300-200)} = 105$$

$$A_3 = \frac{(10800-200)}{(200-180)} = 530$$

In order to calculate the required gain for each summer stage it is necessary first to determine the voltage differential over the range of slant range errors for each particular line segment. By inspection of FIG. 2, this is for curve 10:
 $V_{15} = 31.8$ mV
 $V_{13} = 48.0$ mV
 $V_{11} = 75.0$ mV.

A summer stage is comprised of operational amplifier 84 and its series and shunt resistors. The shunt resistor is of course resistor 82. The series resistors of a particular summer stage are comprised of the series resistors at the output of the various operational elements, for example, resistors 66 and 70 for summer amplification $A_{s1}$, resistors 52 and 56 for summer application $A_{s2}$ and resistors 38 and 42 for summer amplification $A_{s3}$.

The general equation for the gain of an individual summer stage is:

$$A_{sn} = \frac{V_r}{V_{cl}} \text{max.}$$

thus $A_{s1} = \frac{31.8}{10800} = \frac{1}{340}$ $A_{s2} = \frac{40}{10800} = \frac{1}{270}$ $A_{s3} = \frac{75}{10800} = \frac{1}{144}$ Each operational amplifier should switch from a negative output to a positive output at a slant range signal input corresponding to the right hand end point of the corresponding straight line segment. For example, assuming that straight line segment 15 is generated by operational amplifier 64, that element should switch to a positive output so that diode 68 is forward biased at a slant range of twenty miles.

The output of an operational amplifier becomes clamped to the altitude signal corresponding to the left hand end point of its corresponding straight line segment. For example, at an altitude of 6 nautical miles, the output of operational amplifier 64 becomes clamped to the altitude signal through diode 72. To accomplish this the voltage at the junction of resistor 66 with diode 72 must be equal to altitude signal at ten miles slant range. Of course, at the same time clamping occurs in a previous stage, the output of the next stage is turned on, that is, the output of its operational amplifier switches from negative to positive.

In summary, the resistances of FIG. 3 are determined by considering the following steps:
 1. Divide the most significant error curve into the appropriate number of straight line segments considering the accuracy desired.
 2. Determine $V_{c1}$.
 3. Calculate the amplification factors of the various operational elements by consideration of the slope of the corresponding line segment.
 4. Calculate the amplification factors of summing stages.
 5. Select the resistance values of the resistors connected between the output of the slant range buffer amplifier and the summing point through the operational elements to satisfy the amplification factors of steps 3 and 4 above and to set the left hand end point of the corresponding line segment.
 6. Select resistors 28 to 31 by consideration of the right hand end point of the corresponding line segment.
 7. Adjust resistor 80 to scale the slant range contribution at the summing point in accordance with $V_R$ (30 mV/N.M.).

It is a matter for one skilled in the art to select the proper value of resistances to perform the desired approximation. In a circuit actually built the resistances used in a slant range corrector circuit are according to the following table.

| RESISTOR | OHMS (Nearest Standard Value) |
| --- | --- |
| 28 | 100 |
| 29 | 43.2 |
| 30 | 127 |
| 31 | 4940 |
| 32 | 1.87K |
| 34 | 1.0M |
| 38 | 10K |
| 42 | 412K |
| 46 | 5.36K |
| 48 | 562K |
| 52 | 10K |
| 56 | 536K |
| 60 | 11.8K |
| 62 | 402K |
| 66 | 10K |
| 70 | 698K |
| 74 | 2K |
| 76 | 2K |
| 80 | 1.91K to 2.11K |
| 82 | 2K |
| 86 | 1K |

In the embodiment shown, the operational section which includes operational amplifier 64 generates segment 15 of FIG. 2 while the operational elements comprising operational amplifier 64 and 50 together generate the segment 13 of FIG. 2 and three operational elements comprising operational amplifiers 64, 50 and 36 generate segment 11.

At a slant range greater than twenty nautical miles, operational amplifiers 36, 50 and 64 generate negative outputs thus backbiasing their associated diodes so that there is no error contribution at summing point 84a. At slant ranges 20 nautical miles to 10 nautical miles operational amplifier 64 is generating an increasing positive output in accordance with line segment 15 which is applied through diode 68 to summing point 84a. At ten nautical miles slant range the output of operational amplifier 64 is such that the signal at the anode of diode 72 is equal to the altitude signal thus clamping the error contribution from this operational element at the summing point. As the aircraft moves closer to the ground station so that the slant range decreases further operational amplifier 50 begins to generate a positive output signal which passes through diode 54 and is added to the contribution from operational amplifier 64 at summing point 84a. At a slant range of 6.7 nautical miles the contribution of operational amplifier 50 at summing point 84a is also clamped to the altitude signal through the means of diode 58. Thereafter, operational amplifier 36 generates a positive output which passes through diode 40 to summing point 84a. As before, this signal becomes clamped at a slant range of 6 nautical miles. At that time, the aircraft is over the ground station and the error signal is equal to the slant range so that the horizontal range is zero.

It should be noted that diodes 40, 54 and 68 perform two functions for their associated operational elements. First, these diodes are backbiased when their associated operational element is generating a negative output signal, that is, when the slant range is greater than that applicable for the associated element. This prevents an erroneous contribution of the operational element at the summing point. In addition, each of these diodes provides temperature compensation for the other diodes in the operational stage, that is, diode 68 provides temperature compensation for diode 72, etc.

It should now be obvious that if the altitude signal decreases the end points of the various line segments will move in along a line radial to the origin of the curves of FIG. 2. In addition, the various line segments will remain parallel with one another since the amplification of the various amplifiers is dependent upon the value of the resistance elements and these elements remain constant. At an altitude of four nautical miles a slant range error curve 12 becomes applicable and is approximated by the straight line segments 11a, 13a and 15a which are parallel respectively to straight line segments 11, 13 and 15 which approximate curve 10. Note that the maximum slant range at which slant range error correction is made decreases for decreasing altitudes being 20 N.M. at 6 N.M. altitude, 13.25 N.M. for 4 N.M. altitude and 6.5 N.M. for 2 N.M. altitude. If correction is desired at extended ranges another stage in the device of FIG. 3 should be used.

From the teachings herein, one skilled in the art should be able to conceive alterations and modifications of the embodiment described. Accordingly, the invention is to be limited only by the true scope and spirit of the appended claims.

The invention claimed is:

1. Means for generating a family of generic curves which are functions of two independent variables represented by first and second signals, respectively, and wherein each of the curves is approximated by N straight line segments which connect at break points, comprising:

N differential operational elements, one associated with each of said line segments and having an amplification related to the slope of its associated line segment, each of said elements having two inputs;

means for applying said first signal to one of said inputs of each of said elements;

means responsive to said second signal for generating N signals, each related to said second signal and each corresponding to a break point and for applying a separate one of said N signals to each of the other inputs;

means for preventing the output signal of each of said elements from exceeding a value related to said second signal; and, means for summing the output signals of said elements, the resultant sum comprising a signal related to said functions.

2. The means for generating a family of generic curves of claim 1 wherein said means for summing includes means for suppressing the output of an element when the signal at one of its inputs is without a predetermined range of the signal at the other of its inputs.

3. The means for generating a family of generic curves of claim 2 wherein said means for preventing and said means for suppressing comprise diodes.

4. The means for generating a family of generic curves of claim 1 wherein said first signal is proportional to slant range and said second signal is proportional to altitude, the operational elements and means for summing being scaled to generate a function which is correlated to the error of slant range with respect to horizontal range, and wherein said means for summing includes means for computing the difference of said first signal with respect to the generated function to thereby generate a signal related to horizontal range.

5. The means for generating a family of generic curves of claim 4 wherein said means for generating N signals comprises a signal divider across which said second signal is impressed, the N signals thereby being generated at various points of said signal divider.

6. The means for generating a family of generic curves of claim 5 wherein said first and second signals comprise voltage signals and wherein said signal divider comprises a voltage divider.

7. The means for generating a family of generic curves of claim 1 wherein said means for summing comprises amplifier means having an amplification factor related to the range of one of said line segments and the maximum value of one of said first and second signals.

8. Means for generating a family of generic curves which are functions of two independent variables represented by first and second signals, respectively, and wherein each of the curves is approximated by N straight line segments which connect at break points, comprising:

N differential operational elements, one associated with each of said line segments and having an amplification related to the slope of its associated line segment, each of said elements having two inputs, each element including means for suppressing output signals when the signal at one of its inputs is without a predetermined range of the signal at the other of its inputs and also including means for preventing the output signal of each of said elements from exceeding a value related to said second signal;

means for applying said first signal to one of said inputs of each of said elements;

means responsive to said second signal for generating N signals, each related to said second signal and each corresponding to a break point and for applying a separate one of said N signals to each of the other inputs; and, means for summing the output signals of said elements, the resultant sum comprising a signal related to said functions.

9. The means for generating a family of generic curves of claim 8 wherein said means for preventing and means for suppressing comprise diodes.

10. The means for generating a family of generic curves of claim 8 wherein said first signal is proportional to slant range and said second signal is proportional to altitude, the operational elements and means for summing being scaled to generate a function which is correlated to the error of slant range with respect to horizontal range, and wherein said means for summing includes means for computing the difference of said first signal with respect to the generated function to thereby generate a signal related to horizontal range.

11. The means for generating a family of generic curves of claim 10 wherein said means for generating N signals comprises a signal divider across which said second signal is impressed, the N signals thereby being generated at various points of said signal divider.

12. The means for generating a family of generic curves of claim 11 wherein said first and second signals comprise voltage signals and wherein said signal divider comprises a voltage divider.

13. The means for generating a family of generic curves of claim 8 wherein said means for summing comprises amplifier means having an amplification factor related to the range of one of said line segments and the maximum value of one of said first and second signals.

* * * * *